No. 838,055. PATENTED DEC. 11, 1906.
W. S. PITTS, C. A. TANNER & F. G. SPINK.
SAFETY VALVE FOR WATER GAGES.
APPLICATION FILED APR. 13, 1906.

Witnesses
A. J. Foster
R. L. Wallace

Inventors
William S. Pitts
Charles A. Tanner
Floyd G. Spink
By Harry De Wallace
Attorney

UNITED STATES PATENT OFFICE.

WILLIAM S. PITTS, CHARLES A. TANNER, AND FLOYD G. SPINK, OF UTICA, NEW YORK.

SAFETY-VALVE FOR WATER-GAGES.

No. 838,055.      Specification of Letters Patent.      Patented Dec. 11, 1906.

Application filed April 13, 1906. Serial No. 311,472.

*To all whom it may concern:*

Be it known that we, WILLIAM S. PITTS, CHARLES A. TANNER, and FLOYD G. SPINK, citizens of the United States, residing at Utica, in the county of Oneida and State of New York, have invented certain new and useful Improvements in Safety-Valves for Water-Gages, of which the following is a specification.
This invention relates to improvements in safety-valves designed for use in connection with water-gages on the boilers of steam-engines, steam and water heaters to prevent automatically the escape of water and steam in the event of the breaking of the gage-glass.

The invention relates particularly to improvements in that class of devices shown and described in Letters Patent heretofore issued to Benjamin Hadley and Bryan Moylan, numbered and dated as follows: No. 810,746, dated January 23, 1906.

The object of our invention is to provide a check-valve and a stop-cock or valve and to combine the two in a single casing or part capable of being directly connected to a boiler, thereby requiring less space to install it, because of the elimination of a number of connecting parts, and which can be produced at a smaller expense and applied with less labor than devices of a similar nature.

A further object of the invention is to provide a check-valve which cannot be closed except by the breaking or removal of the water-gage, but which may be opened and held open for the purpose of blowing out said gage whenever desired.

The various features and parts comprising our invention will be more fully understood by reference to the accompanying drawings, forming a part of this specification, and in which—

Figure 1:
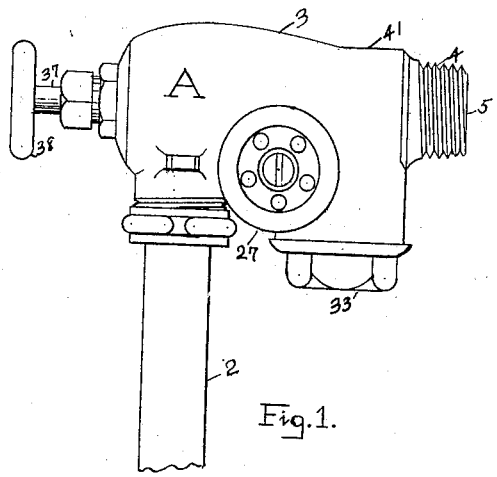
Figure 2:
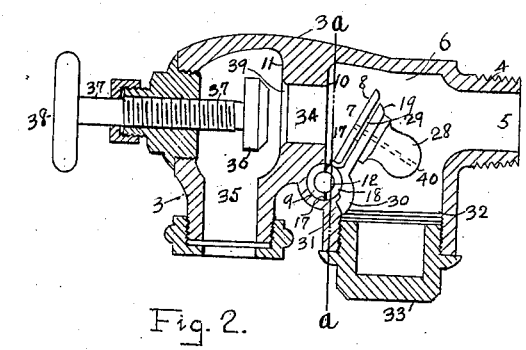
Figures 3, 4:
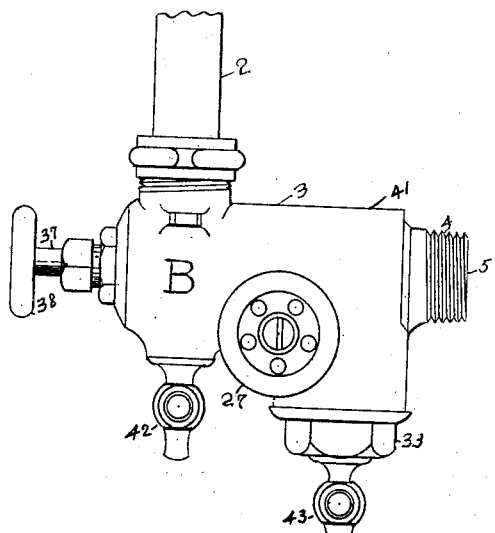
Figures 5, 6, 7:
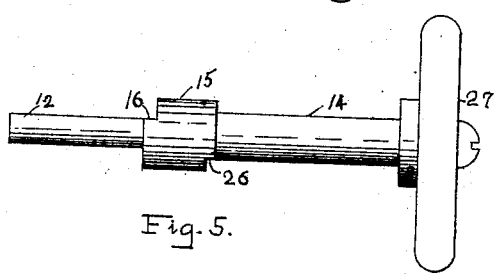

Figure 1 is a side elevation of a water-gage with our combined safety-valve and stop-cock applied thereto. Fig. 2 is a vertical longitudinal section through one of the combined valves. Fig. 3 is a vertical cross-section substantially on the line *a a* of Fig. 2. Fig. 4 is a rear end elevation taken from one of the valves of Fig. 1, the blow-off cock being omitted. Fig. 5 is an enlarged detail of the stem or rod used for opening the check-valve. Fig. 6 is a view of the follower, showing the shouldered projection used for limiting the movement of the operating-stem. Fig. 7 is a view of the opposite side of the follower.

Similar characters of reference are assigned to corresponding parts throughout the several figures of the drawings.

In the drawings, 2 represents the glass tube of a water-gage, which is disposed between a pair of our combined valves, being applied thereto in the customary manner.

A represents the uppermost valve, and B the lowermost valve. These valves are exactly the same in function and operation; but on account of the manner in which they are connected with the water-gage and the boiler it has been found necessary to give them a slightly different form externally.

3 represents the integral casing or shell in which the safety or check valve and stop-cock are located and which is made of metal, preferably tough brass. The casings are each provided with the threaded part 4 for use in attaching the same to a boiler. We have provided the external threading 4, so that our improvement may be screwed directly into the boiler, thus doing away with the nipples and bushings heretofore employed for making these connections.

5 is a port through which the steam or water from the boiler passes into a large cavity or chamber 6 within said casing, in which is disposed the check-valve. The check-valve in each case is composed of the valve 8, which is pivoted or hinged at 9, being directly below the vertical valve-seat 10, formed on one side of the partition or wall 11, which divides said casing centrally, the valve 8 being hinged to a pin or rod 12, one end of which enters the socket 13, formed in the casing 3, the other end of which projects from a plain stem 14, provided with an enlarged cylindrical portion 15, formed integrally with said stem. The inner end of the part 15 is provided with a tooth or offset 16, which is disposed so that it will engage a like tooth or offset 17, formed on one face of the knuckle 18 of the valve-arm 19.

20 represents a threaded socket formed in the casing 3, into which the stuffing-box 21 is screwed. The stuffing-box is provided on its outer end with the packing nut or gland 22. The socket 20 is bored out to a greater depth than required for fitting the stuffing-box for the purpose of receiving a follower or flat ring 24, which is bored out centrally to loosely fit the stem 14. The follower is made large enough in diameter and thick enough to be engaged and held tightly against the bottom of the socket by the stuffing-box when the latter is screwed in as far as it will go, and when placed in such manner the follower will be rigidly held from movement in any direction. The inner face of the follower is provided with a raised portion 25, semicircular in form, the ends thereof being cut square, so as to form strong shoulders which are adapted to engage a corresponding shoulder or tooth 26 on the outer end of the cylindrical part 15 of the stem. The object of these shoulders will be fully explained below. The stem 14 is provided with a hand-wheel 27, by means of which it is operated.

28 represents a counterweight part which is attached to the valve 8 and is intended to assist said valve in opening and being held in such position by gravity, as shown in Figs. 2 and 3. Valve 8 is secured to counterweight 28 by a stud 29, a part of the counterweight, which holds these parts rigidly together, while the stud fits loosely in the valve-arm 19, through which it passes, thus forming a sort of swivel connection and allowing sufficient looseness or play to these parts to insure the proper seating of the valve when it is closed by the force or suction of the boiler-pressure.

30 represents a lug or stop formed on the lower portion of the valve-arm 19 for the purpose of limiting the opening movement of the check-valve. As illustrated in Fig. 2, this lug or stop when said valve is open bears against the inner wall of the casing at 31 and holds the valve at such an angle that it may be readily and quickly seated or closed in case the gage-glass breaks.

32 represents an opening in the lower portion of each of the casings directly below the check-valves, which is provided for the purpose of inserting and removing the check-valves and also to afford means for cleaning sediment from the leg of the valve-casings. A screw-threaded plug 33 is provided for tightly closing said opening.

The partition 11, which divides casing 3 centrally, is provided with a port or opening 34, which is disposed concentrically with the valve-seat 10, and is therefore so located that when the check-valve closes it prevents the passage of water or steam from chamber 6 through said port into chamber 35, in which stop-cock 36 is placed. Stop-cock 36 is mounted on a screw-threaded stem 37, which is positioned horizontally and directly in line with port 34. A hand-wheel 38 is attached to the outer end of stem 37 for use in operating said cock. Stop cock or valve 36 is formed to fit into a cone-seat 39 in said partition.

The check-valves are provided with a small by-pass or port 40, formed through counterweights 28 and stud 29 to afford a continual slow feed from the boiler to the gage parts at times when the check-valve is closed. The purpose of this port or by-pass is to allow a slight steady feed of water and steam from chambers 6 into chambers 35 and thence into the gage-glass, after the latter has been newly installed, so as not to endanger the new glass, as would be the case if the full force and heat of the boiler-pressure were suddenly turned into the new glass. This port is not large enough, however, to allow a sufficient volume of steam or water to escape during the interval a glass remains broken or while the same is being replaced to scald or harm any one; but if the escaping water or steam interferes with the work of replacing a broken glass, or in case no glass for the purpose is obtainable at the time, stop-cocks 36 may be seated, thus closing ports 34 and preventing any escape of the pressure from the boiler. The water or steam pressure coming from the boiler will flow through port 5 into chamber 6, and when the check-valve is open, as shown in Fig. 2, it will pass freely through ports 34 in partitions 11 to chambers 35 and from the latter space into gage-glass 2.

The rear end of the casings of our combination-valve is squared on the sides and top near the threaded part 4, as at 41, to receive a wrench for use in attaching the device to a boiler. Two blow-off cocks 42 and 43 are provided on the lower valve-casing, the former for use in cleaning the water-gage and the latter for blowing out any dirt or sediment which may gather in the bottom or leg of cavity 6, in which the check-valve is located.

It will be seen that the check-valves are so positioned normally that the breaking of the gage-glass or the blowing out of the water or steam through ports 34 will draw the valve 8 into closed position against the seats 10, and said valve will be held closed by the force of the boiler-pressure as long as blow-out cock 42 is left open, as well as during the interval between the breaking and the replacing of the gage-glass. As soon as the glass tube has been replaced or petcock 42 closed the slight feed of water and steam pressure through the small ducts or passages 40 will within a few minutes' time restore the equilibrium of pressure in the gage parts, and soon as the pressure becomes balanced on both sides of the check-valves the latter will gravitate to open position, as shown in Fig. 2, without any assistance, because there will then be no force or suction to draw or hold said valve against its seat.

The object of the check-valves described and shown herein is to provide safe and reliable automatic means for closing the passage for steam and water pressure from a boiler to the gage instantly upon the breaking of the gage-glass. Therefore it is not intended that the check-valves should be operated by any one except under certain conditions.

It will be seen by reference to Fig. 3 that the stem 14, the valve-knuckle 18, and the follower 24 are so formed and disposed that when one turns hand-wheel 27 and stem 14 to the right tooth 16 engages an opposing projection or shoulder 17 on the end of said knuckle and the check-valve if closed is thereby moved away from its seat 10 until the stop 30 strikes the casing at 31. This is as far as the valve may be moved by the turning of stem 14. The check-valve may be thus held open against the force of the pressure from the boiler, even though the blow-out cock 42 be open or the glass remains broken; but during such interval the person operating said stem must hold onto it, because there are no means provided for retaining the stem and valve in the position just described if the operator releases his hold on hand-wheel 27. This feature is provided so that the check-valve cannot be opened either accidentally or otherwise and left in such position and thereby hindered from closing automatically when such operation is required. The movement of the stem to the right is but a small part of a turn, being limited by the stop 30, as described. The movement or revolving of the stem to the left is also limited by the teeth or projections 25 and 26, which are formed on the follower and stem, respectively. These last-named teeth are arranged so that the stem may be turned to the left a little more than the distance required for the check-valve to move from its open to the closed position to allow the valve to become seated without being hindered by the engagement of teeth 16 and 17. The stem 14 is also fitted into the stuffing-box and casing in such a manner that it may be readily rotated to the left by the force of the pressure against the check-valve in case the operator neglects to turn the stem back after opening the valve to blow out the glass or other parts.

The screw-threaded stem for operating the check-valve described and shown in the patent hereinbefore referred to could be turned to the right and set so tightly on the threads that it would be impossible for the pressure to close the valve in case the person operating it left it in that position. By the employment of a stem constructed and fitted as shown and described herein it makes our valves more safe and reliable than any other device known to us.

Obviously the detail construction of the device as herein shown and described may be altered without departing from the spirit of our invention, and we therefore do not confine the same to the precise form and arrangements of parts herein shown.

Having thus described our invention, what we claim as new, and desire to secure by Letters Patent, is—

1. In a safety appliance, the combination with a water-gage, of an integral valve-casing having a partition or wall dividing the inner space thereof centrally, a port or passage through said partition or wall forming a connection between the two inner spaces, a check-valve having a by-pass therethrough hinged below and adapted to close one end of said port or passage automatically when said gage breaks, a stop-cock adapted to close the opposite end of said port or passage, a stem extending part way through said casing, the inner end thereof forming a hinge-pin for said check-valve, a tooth on said stem adapted to move said check-valve to and hold the same in open position, a second tooth on said stem, a follower disposed concentrically with said stem and having a shoulder adapted to engage said second tooth and thereby limit the movement of said stem in the opposite direction, and a stuffing-box surrounding said stem adapted to hold said follower and said stem in place, substantially as described.

2. The combination with a water-gage, of an integral casing having a central transverse wall forming two valve-chambers therein, a passage through said partition connecting said valve-chambers and having a valve-seat formed at each end thereof, a counterweighted check-valve in one of said valve-chambers, a stop-cock in the opposite valve-chamber, a stem having oppositely-facing teeth, extending part way through said casing, the inner end thereof forming a hinge-pin for said check-valve, the outer end thereof being fitted with a hand-wheel, a follower or ring disposed concentrically with said stem and having a shouldered projection on the inner face thereof adapted to engage one of the teeth on said stem, a shoulder on the valve-knuckle adapted to engage the opposite tooth on said stem, and a stuffing-box adapted to hold said follower in rigid position, substantially as described.

3. The combination with a water-gage, of a one-part casing having a central partition forming two valve-chambers therein, a port or duct connecting said valve-chambers and having a valve-seat formed at each end thereof, a check-valve having a by-pass, disposed in one of said valve-chambers, a stem having a tooth adapted to unseat and hold said check-valve in open position, a follower having a shoulder to limit the movement of said stem in one direction, and a stuffing-box adapted to prevent said follower from turning with said stem, substantially as described.

4. A safety-valve, comprising a one-part casing or shell in combination with a water-gage, an inner wall dividing said casing into two valve-chambers, a passage through said wall connecting said chambers, a hinged valve disposed in one of said chambers adapted to partially close said passage, a stop-cock in the second chamber in line with and adapted to entirely close said passage, a stem or rod, the inner end thereof forming a hinge-pin for said valve, the outer end being fitted with a hand-wheel, a tooth on said stem or rod and an oppositely-facing tooth on the knuckle of said valve, said teeth being arranged to interlock and effect the opening, but not the closing of said valve when said hand-wheel is operated, a lug or stop on the arm of said valve to limit the opening movement thereof, a follower disposed concentrically with said stem and having a projecting shoulder to limit the movement of said stem in the direction for closing said valve, and blow-out cocks for cleaning out the gage-glass and one of said valve-chambers, substantially as described.

5. The combination with a water-gage, of a pair of integral valve-casings having external screw-threads for directly connecting them to a boiler, a partition dividing each of said casings centrally thereby forming two valve-chambers therein, a horizontal passage through said partition, a check-valve hinged below said passage in the corresponding chambers in each casing, said check-valves being held normally in open position by gravity when the pressure on either side thereof is equal, but adapted to close said passage immediately upon the breaking of the water-gage, a cock disposed in the chambers opposite each of said check-valves adapted to close said passage when operated by hand, a stem fitting each casing adapted to open said check-valves, a follower to limit the movement of said stem in the opposite direction, and a slow-feed port in each check-valve to effect the equalizing of the pressure and permit the force of gravity to open said check-valves after the replacing of said water-gage, substantially as described.

In testimony whereof we affix our signatures in presence of two witnesses.

WILLIAM S. PITTS.
CHARLES A. TANNER.
FLOYD G. SPINK.

Witnesses:
  W. L. GOODIN,
  M. H. SEXTON.